(12) United States Patent
Carlson

(10) Patent No.: US 10,849,343 B2
(45) Date of Patent: *Dec. 1, 2020

(54) STABLE ELECTROLYTE MATERIAL AND SOLVENT MATERIAL CONTAINING SAME

(71) Applicant: Lawrence Carlson, Troy, MI (US)

(72) Inventor: Lawrence Carlson, Troy, MI (US)

(73) Assignee: Tygrus, LLC, Troy, MI (US)

( * ) Notice: Subject to any disclaimer, the term of this patent is extended or adjusted under 35 U.S.C. 154(b) by 209 days.

This patent is subject to a terminal disclaimer.

(21) Appl. No.: 15/654,398

(22) Filed: Jul. 19, 2017

(65) Prior Publication Data

US 2018/0020704 A1     Jan. 25, 2018

Related U.S. Application Data

(60) Provisional application No. 62/364,136, filed on Jul. 19, 2016.

(51) Int. Cl.
| | |
|---|---|
| A23L 3/3454 | (2006.01) |
| A23L 2/68 | (2006.01) |
| A23L 3/358 | (2006.01) |
| A23L 27/12 | (2016.01) |
| A23L 7/10 | (2016.01) |
| A23L 2/56 | (2006.01) |
| A23L 2/02 | (2006.01) |
| A23L 2/52 | (2006.01) |
| A23B 7/10 | (2006.01) |

(52) U.S. Cl.
CPC .............. *A23L 3/3454* (2013.01); *A23B 7/10* (2013.01); *A23L 2/02* (2013.01); *A23L 2/52* (2013.01); *A23L 2/56* (2013.01); *A23L 2/68* (2013.01); *A23L 3/358* (2013.01); *A23L 27/12* (2016.08); *A23V 2002/00* (2013.01)

(58) Field of Classification Search
CPC ....................................................... C01B 13/00
See application file for complete search history.

(56) References Cited

U.S. PATENT DOCUMENTS

| | | |
|---|---|---|
| 6,197,816 B1 | 3/2001 | Vincent et al. |
| 6,436,891 B1 | 8/2002 | Kemp et al. |
| 7,513,987 B1 | 4/2009 | Wurzbarger |

FOREIGN PATENT DOCUMENTS

WO    0134754 A1    5/2001

OTHER PUBLICATIONS

Xie Zuowei et al., "A Crystalline [H$_9$O$_4$]+Hydronium ion salt with a weakly coordinating anion". Inorganic chemistry, 1995, 34 (22), pp. 5403-5404.

Supplementary European Search Report, European Patent Office Application No. EP17831804, dated Feb. 20, 2020, 9 pages.

*Primary Examiner* — Peter F Godenschwager
(74) *Attorney, Agent, or Firm* — Young Basile Hanlon & MacFarlane, P.C.

(57) ABSTRACT

A composition of matter having the following chemical structure:

$$\left[\frac{H_xO_{(x-1)}}{2}\right]Z_y$$

wherein x is and odd integer ≥3;
y is an integer between 1 and 20; and
Z is one of a monoatomic ion from Groups 14 through 17 having a charge value between −1 and −3 or a polyatomic ion having a charge between −1 and −3.

18 Claims, No Drawings

STABLE ELECTROLYTE MATERIAL AND SOLVENT MATERIAL CONTAINING SAME

The present invention is a non-provisional filing claiming priority to U.S. Provisional Application No. 62/364,136 file Jul. 19, 2016, the specification of which is incorporated by reference herein.

BACKGROUND

The present invention relates to compositions that can be integrated into food products to enhance the flavor of the associated food products.

A variety of food preparation and/or preservation processes are employed in which foods are packaged for consumption at a later time. When employed with various vegetables, fruits, juices and liquid compositions, these packaging processes can include various forms of canning, freezing, salting, pickling, smoking and the like. Additionally, various foods can be processed cured prior to refrigerated, frozen or other forms of storage. Non-limiting examples of such food processing technologies include pasteurization, addition of artificial food additives, irradiation and the like. Such processes can alter the inherent flavor of one or more ingredients of the food being preserved.

It is desirable to provide a fuller richer taste to foodstuffs, beverages, oral care products and the like. It is also desirable to provide foodstuff, beverages and oral care products having a fuller and richer taste.

SUMMARY

It has been unexpectedly discovered that a substance having the following chemical structure:

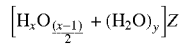

wherein x is and odd integer ≥3;
y is an integer between 1 and 20; and
Z is a polyatomic ion or monoatomic ion
can be used advantageously to improve the taste of food stuffs, beverages, pharmaceuticals and oral care products. The taste improving substances according to the present invention are particularly useful in a wide variety of applications including savory food, non-savory food, such as dairy, beverages, fruits and vegetables and their associated dishes and confectionery, as well as pharmaceutics, and oral care products.

It has also been found, quite unexpectedly that a solution that is composed of the compound

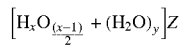

wherein x is and odd integer ≥3;
y is an integer between 1 and 20; and
Z is a polyatomic ion or monoatomic ion; and
a solvent
can be incorporated into various materials to improve the taste of foodstuffs, beverages, pharmaceutics, and oral care products.

DETAILED DESCRIPTION

The present disclosure is predicated on the unexpected discovery that the electrolyte oxonium ion complexes as disclosed herein when employed in various food compositions can enhance the flavor of the associated food stuff, beverage, pharmaceutical or oral care product can enhance the flavor panel of the associated material and/or increase the preservative nature of the of the composition. The electrolyte can be present in an amount between 0.01 wt % to 30 wt % in certain embodiments.

The electrolyte that can be employed in is broadly construed as an oxonium ion-derived complex. As defined herein "oxonium ion complexes" are generally defined as positive oxygen cations having at least one trivalent oxygen bond. In certain embodiments the oxygen cation will exist in aqueous solution as a population predominantly composed of one, two and three trivalently bonded oxygen cations present as a mixture of the aforesaid cations or as material having only one, two or three trivalently bonded oxygen cations. Non-limiting examples of oxonium ions having trivalent oxygen cations can include at least one of hydronium ions.

It is contemplated that the in certain embodiments the oxygen cation will exist in aqueous solution as a population predominantly composed of one, two and three trivalently bonded oxygen anions present as a mixture of the aforesaid anions or as material having only one, two or three trivalently bonded oxygen anions.

When the compound as disclosed herein is admixed with a solvent such as an aqueous or organic solvent, the resulting material includes a solution that can be composed of hydronium ions, hydronium ion complexes and mixtures of the same. The composition of matter and solutions that contain the same have utility in various food and ingestible compositions either where low pH values are desirable and/or where flavor enhancement is desired.

It has been theorized that extreme trace amounts of cationic hydronium may spontaneously form in water from water molecules in the presence of hydrogen ions. Without being bound to any theory, it is believed that naturally occurring hydronium ions are extremely rare. The concentration of naturally occurring hydronium ions in water is estimated to be no more than 1 in 480,000,000. If they occur at all, hydronium ion compounds are extremely unstable. It is also theorized that naturally occurring hydronium ions are unstable transient species with lifespans typically in the range of nanoseconds. Naturally occurring hydronium ion species are reactive and are readily solvated by water and as such these hydronium ions (hydrons) do not exist in a free state.

When introduced into pure water, the stable hydronium material disclosed herein is one that will remain identifiable. It is believed that the stable hydronium material disclosed herein can complex with water molecules to form hydration cages of various geometries, non-limiting examples of which will be described in greater detail subsequently. The stable electrolyte material as disclosed herein, when introduced into a polar solvent such as an aqueous solution is stable and can be isolated from the associated solvent as desired or required.

Conventional strong organic and inorganic acids such as those having a $pK_a \geq 1.74$, when added to water, will ionize completely in the aqueous solution. The ions so generated will protonate existing water molecules to form $H_3O+$ and associate stable clusters. Weaker acids, such as those having a $pK_a < 1.74$, when added to water, will achieve less than complete ionization in aqueous solution but can have utility in certain applications. Thus, it is contemplated that the acid material employed to produce the stable electrolyte material can be a combination of one or more acids. In certain embodiments, the acid material will include at least one acid having a $pK_a$ greater than or equal to 1.74 in combination with weaker acids(s).

In the present disclosure, it has been found quite unexpectedly that the stable hydronium electrolyte material as defined herein, when added to an aqueous solution, will produce a polar solvent and provide and effective $pK_a$ which is dependent on the amount of stable hydronium material added to the corresponding solution independent of the hydrogen ion concentration originally present in that solution. The resulting solution can function as a polar solvent and can have an effective $pK_a$ between 0 and 5 in certain applications when the initial solution pH prior to addition of the stable hydronium material is between 6 and 8.

It is also contemplated that the stable electrolyte material as disclosed herein can be added to solutions having an initial pH in the alkaline range, for example between 8 and 12 to effectively adjust the pH of the resulting solvent and/or the effective or actual $pK_a$ of the resulting solution. Addition of the stable electrolyte material as disclosed herein can be added to an alkaline solution without perceivable reactive properties including, but not limited to, exothermicity, oxidation or the like.

The acidity of theoretical hydronium ions existing in water as a result of aqueous auto-dissociation is the implicit standard used to judge the strength of an acid in water. Strong acids are considered better proton donors than the theoretical hydronium ion material otherwise a significant portion of acid would exist in a non-ionized state. As indicated previously, theoretical hydronium ions derived from aqueous auto-dissociation are unstable as a species, random in occurrence and believed to exist, if at all in extreme low concentration in the associated aqueous solution. Generally, hydronium ions in aqueous solution are present in concentrations between less than 1 in 480,000,000 and can be isolated, if at all, from native aqueous solution via solid or liquid phase organosynthesis as monomers attached to a superacid solution in structures such as $HF—SbF_5SO_2$. Such materials can be isolated only in extremely low concentration and decompose readily upon isolation.

In contrast, the stable hydronium material as disclosed herein, provides a source of concentrated hydronium ions that are long lasting and can be subsequently isolated from solution if desired or required.

In certain embodiments, the composition of matter, has the following chemical structure:

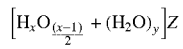

wherein x is and odd integer between 3 and 11;
y is an integer between 1 and 10; and
Z is a polyatomic or monoatomic ion.

The polyatomic ion Z can be derived from an ion that is derived from an acid having the ability to donate one or more protons. The associated acid can be one that would have a $pK_a$ values≥1.7 at 23° C. The polyatomic ion Z employed can be one having a charge of +2 or greater. Non-limiting examples of such polyatomic ions include sulfate ions, carbonate ions, phosphate ions, oxalate ions, chromate ions, dichromate ions, pyrophosphate ions and mixtures thereof. In certain embodiments, it is contemplated that the polyatomic ion can be derived from mixtures that include polyatomic ions that include ions derived from acids having $pK_a$ values≤1.7.

The stable electrolyte material as disclosed herein is stable at standard temperature and pressure and can exist as an oily liquid. The stable electrolyte material can be added to water or other polar solvent to produce a polar solution that contains an effective concentration of stable hydronium ion that is greater than 1 part per million. In certain embodiments the stable electrolyte material as disclosed herein can provide an effective concentration stable hydronium ion material concentrations greater than between 10 and 100 parts per million when admixed with a suitable aqueous or organic solvent.

It has been found, quite unexpectedly, that the hydronium ion complexes present in solution present as a result of the addition of the stable electrolyte material disclosed herein alter the acid functionality of the resulting solvent material without a concomitant change in the free acid to total acid ratio. The alteration in acid functionality can include characteristics such as change in measured pH, changes in free-to-total acid ratio, changes in specific gravity and rheology. Changes in spectral and chromatography output are also noted as compared to the incumbent acid materials used in production of the stable electrolyte material containing the initial hydronium ion complex. Addition of the stable electrolyte material as disclosed herein results in changes in $pK_a$ which do not correlate to the changes observed in free-to-total acid ratio.

Thus the addition of the stable electrolyte material as disclosed herein to an aqueous solution having an initial pH between 6 and 8 results in a solution having an effective $pK_a$ between 0 to 5. It is also to be understood that $pK_a$ of the resulting solution can and a value less than zero as when measured by a calomel electrode, specific ion ORP probe. As used herein the term "effective $pK_a$" is a measure of the total available hydronium ion concentration present in the resulting solvent. Thus it is possible that pH and/or associated pKa of a material when measured may have a numeric value represented between −3 and 7.

Typically, the pH of a solution is a measure of its proton concentration or as the inverse proportion of the —OH moiety. It is believed that the stable electrolyte material as disclosed herein, when introduced into a polar solution, facilitates at least partial coordination of hydrogen protons with the hydronium ion electrolyte material and/or its associated lattice or cage. As such, the introduced stable hydronium ion exists in a state that permits selective functionality of the introduced hydrogen associated with the hydrogen ion.

More specifically, the stable electrolyte material as disclosed herein can have the general formula:

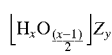

x is and odd integer ≥3;
y is an integer between 1 and 20; and
Z is one of a monoatomic ion from Groups 14 through 17 having a charge between −1 and −3 or a poly atomic ion having a charge between −1 and −3.

In the composition of matter as disclosed herein, monatomic constituents that can be employed as Z include Group 17 halides such as fluoride, chloride, iodide and bromide; Group 15 materials such as nitrides and phosphides and Group 16 materials such as oxides and sulfides. Polyatomic constituents include carbonate, hydrogen carbonate, chromate, cyanide, nitride, nitrate, permanganate, phosphate, sulfate, sulfite, chlorite, perchlorate, hydrobromite, bromite, bromate, iodide, hydrogen sulfate, hydrogen sulfite. It is contemplated that the composition of matter can be composed of a single one to the materials listed above or can be a combination of one or more of the compounds listed.

It is also contemplated that, in certain embodiments, x is an integer between 3 and 9, with x being an integer between 3 and 6 in some embodiments.

In certain embodiments, y is an integer between 1 and 10; while in other embodiments y is an integer between 1 and 5.

The composition of matter as disclosed herein can have the following formula, in certain embodiments:

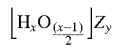

x is and odd integer between 3 and 12;
y is an integer between 1 and 20; and
Z is one of a group 14 through 17 monoatomic ion having a charge between −1 and −3 or a poly atomic ion having a charge between −1 and −3 as outlined above. With some embodiments having x between 3 and 9 and y being an integer between 1 and 5.

It is contemplated that the composition of matter exists as an isomeric distribution in which the value x is an average distribution of integers greater than 3 favoring integers between 3 and 10.

The composition of matter as disclosed herein can be formed by the addition of a suitable inorganic hydroxide to a suitable inorganic acid. The inorganic acid may have a density between 22° and 70° baume; with specific gravities between about 1.18 and 1.93. In certain embodiments, it is contemplated that the inorganic acid will have a density between 50° and 67° baume; with specific gravities between 1.53 and 1.85. The inorganic acid can be either a monoatomic acid or a polyatomic acid.

The inorganic acid employed can be homogenous or can be a mixture of various acid compounds that fall within the defined parameters. It is also contemplated that the acid may be a mixture that includes one or more acid compounds that fall outside the contemplated parameters but in combination with other materials will provide an average acid composition value in the range specified. The inorganic acid or acids employed can be of any suitable grade or purity. In certain instances, tech grade and/or food grade material can be employed successfully in various applications.

In preparing the stable electrolyte material as disclosed herein, the inorganic acid can be contained in any suitable reaction vessel in liquid form at any suitable volume. In various embodiments, it is contemplated that the reaction vessel can be non-reactive beaker of suitable volume. The volume of acid employed can be as small as 50 ml. Larger volumes up to and including 5000 gallons or greater are also considered to be within the purview of this disclosure.

The inorganic acid can be maintained in the reaction vessel at a suitable temperature such as a temperature at or around ambient. It is within the purview of this disclosure to maintain the initial inorganic acid in a range between approximately 23° and about 70° C. However lower temperatures in the range of 15° and about 40° C. can also be employed.

The inorganic acid is agitated by suitable means to impart mechanical energy in a range between approximately 0.5 HP and 3 HP with agitation levels imparting mechanical energy between 1 and 2.5 HP being employed in certain applications of the process. Agitation can be imparted by a variety of suitable mechanical means including, but not limited to, DC servodrive, electric impeller, magnetic stirrer, chemical inductor and the like.

Agitation can commence at an interval immediately prior to hydroxide addition and can continue for an interval during at least a portion of the hydroxide introduction step.

In the process as disclosed herein, the acid material of choice may be a concentrated acid with an average molarity (M) of at least 7 or above. In certain procedures, the average molarity will be at least 10 or above; with an average molarity between 7 and 10 being useful in certain applications. The acid material of choice employed may exist as a pure liquid, a liquid slurry or as an aqueous solution of the dissolved acid in essentially concentrated form.

Suitable acid materials can be either aqueous or non-aqueous materials. Non-limiting examples of suitable acid materials can include one or more of the following: hydrochloric acid, nitric acid, phosphoric acid, chloric acid, perchloric acid, chromic acid, sulfuric acid, permanganic acid, prussic acid, bromic acid, hydrobromic acid, hydrofluoric acid, iodic acid, fluoboric acid, fluosilicic acid, fluotitanic acid.

In certain embodiments, the defined volume of a liquid concentrated strong acid employed can be sulfuric acid having a specific gravity between 55° and 67° baume. This material can be placed in the reaction vessel and mechanically agitated at a temperature between 16° and 70° C.

In certain specific applications of the method disclosed, a measured, defined quantity of suitable hydroxide material can be added to an agitating acid, such as concentrated sulfuric acid, that is present in the non-reactive vessel in a measured, defined amount. The amount of hydroxide that is added will be that sufficient to produce a solid material that is present in the composition as a precipitate and/or a suspended solids or colloidal suspension. The hydroxide material employed can be a water-soluble or partially water-soluble inorganic hydroxide. Partially water-soluble hydroxides employed in the process as disclosed herein will generally be those which exhibit miscibility with the acid material to which they are added. Non-limiting examples of suitable partially water-soluble inorganic hydroxides will be those that exhibit at least 50% miscibility in the associated acid. The inorganic hydroxide can be either anhydrous or hydrated.

Non-limiting examples of water-soluble inorganic hydroxides include water soluble alkali metal hydroxides, alkaline earth metal hydroxides and rare earth hydroxides; either alone or in combination with one another. Other hydroxides are also considered to be within the purview of this disclosure. "Water-solubility" as the term is defined in conjunction with the hydroxide material that will be employed is defined a material exhibiting dissolution characteristics of 75% or greater in water at standard temperature and pressure. The hydroxide that is utilized typically is a liquid material that can be introduced into the acid material. The hydroxide can be introduced as a true solution, a suspension or a super-saturated slurry. It certain embodiments, it is contemplated that the concentration of the inorganic hydroxide in aqueous solution can be dependent on the concentration of the associated acid to which it is introduced. Non-limiting examples of suitable concentrations for the hydroxide material are hydroxide concentrations greater than 5 to 50% of a 5-mole material.

Suitable hydroxide materials include, but are not limited to, lithium hydroxide, sodium hydroxide, potassium hydroxide, ammonium hydroxide, calcium hydroxide, strontium hydroxide, barium hydroxide, magnesium hydroxide, and/or silver hydroxide. Inorganic hydroxide solutions when employed may have concentration of inorganic hydroxide between 5 and 50% of a 5-mole material, with concentration between 5 and 20% being employed in certain applications. The inorganic hydroxide material, in certain processes, can be calcium hydroxide in a suitable aqueous solution such as is present as slaked lime.

In the process as disclosed, the inorganic hydroxide in liquid or fluid form is introduced into the agitating acid material in one or more metered volumes over a defined interval to provide a defined resonance time. The resonance time in the process as outlined is considered to be the time interval necessary to promote and provide the environment in which the hydronium ion material as disclosed herein develops. The resonance time interval as employed in the process as disclosed herein is typically between 12 and 120 hours with resonance time intervals between 24 and 72 hours and increments therein being utilized in certain applications.

In various applications of the process, the inorganic hydroxide is introduced into the acid at the upper surface of the agitating volume in a plurality of metered volumes. Typically, the total amount of inorganic hydroxide material will be introduced as a plurality of measured portions over the resonance time interval. Front loaded metered addition being employed in many instances. "Front loaded metered addition", as the term is used herein, is taken to mean addition of the total hydroxide volume with a greater portion being added during the initial portion of the resonance time. An initial percentage of the desired resonance time. is considered to be between the first 25% and 50% of the total resonance time.

It is to be understood that the proportion of each metered volume that is added can be equal or can vary based on such non-limiting factors as external process conditions, in situ process conditions, specific material characteristics, and the like. It is contemplated that the number of metered volumes can be between 3 and 12. The interval between additions of each metered volume can be between 5 and 60 minutes in certain applications of the process as disclosed. The actual addition interval can be between 60 minutes to five hours in certain applications.

In certain applications of the process, a 100 ml volume of 5% weight per volume of calcium hydroxide material is added to 50 ml of 66° baume concentrated sulfuric acid in 5 metered increments of 2 ml per minute, with or without admixture. Addition of the hydroxide material to the sulfuric acid results produces a material having increasing levels of liquid turbidity. Increasing liquid turbidity is indicative of calcium sulfate solids as precipitate. The produced calcium sulfate can be removed in a fashion that is coordinated with continued hydroxide addition in order to provide a coordinated concentration of suspended and dissolved solids.

Without being bound to any theory, it is believed that the addition of calcium hydroxide to sulfuric acid in the manner defined herein results in the consumption of the initial hydrogen proton or protons associated with the sulfuric acid resulting in hydrogen proton oxygenation such that the proton in question is not off-gassed as would be generally expected upon hydroxide addition. Instead, the proton or protons are recombined with ionic water molecule components present in the liquid material.

After the suitable resonance time as defined has passed, the resulting material is subjected to a non-bi-polar magnetic field at a value greater than 2000 gauss; with magnetic fields great than 2 million gauss being employed in certain applications. It is contemplated that a magnetic field between 10,000 and 2 million gauss can be employed in certain situations. The magnetic field can be produced by various suitable means. One non-limiting example of a suitable magnetic field generator is found in U.S. Pat. No. 7,122,269 to Wurzburger, the specification of which is incorporated by reference herein.

Solid material generated during the process and present as precipitate or suspended solids can be removed by any suitable means. Such removal means include, but need not be limited to, the following: gravimetric, forced filtration, centrifuge, reverse osmosis and the like.

The stable electrolyte composition of matter as disclosed herein is a shelf-stable viscous liquid that is believed to be stable for at least one year when stored at ambient temperature and between 50 to 75% relative humidity. The stable electrolyte composition of matter can be use neat in various end use applications. The stable electrolyte composition of matter can have a 1.87 to 1.78 molar material that contains 8 to 9% of the total moles of acid protons that are not charged balanced.

The stable electrolyte composition of matter which results from the process as disclosed herein has molarity of 200 to 150 M strength, and 187 to 178 M strength in certain instances, when measured titramtrically though hydrogen coulometry and via FFTIR spectral analysis. The material has a gravimetric range greater than 1.15; with ranges greater than 1.9 in in certain instances. The material, when analyzed, is shown to yield up to 1300 volumetric times of orthohydrogen per cubic ml versus hydrogen contained in a mole of water.

It is also contemplated that the composition of matter as disclosed can be introduced into a suitable polar solvent and will result in a solution having concentration of hydronium ions greater than 15% by volume. In some applications, the concentration of hydronium ions can be greater than 25% and it is contemplated that the concentration of hydronium ions can be between 15 and 50% by volume.

The suitable polar solvent can be either aqueous, organic or a mixture of aqueous and organic materials. In situations where the polar solvent includes organic components, it is contemplated that the organic component can include at least one of the following: saturated and/or unsaturated short chain alcohols having less than 5 carbon atoms, and/or saturated and unsaturated short chain carboxylic acids having less than 5 carbon atoms. Where the solvent comprises water and organic solvents, it is contemplated that the water to solvent ratio will be between 1:1 and 400:1, water to solvent, respectively. Non-limiting examples of suitable solvents include various materials classified as polar protic solvents such as water, acetic acid, methanol, ethanol, n propanol, isopropanol, n-butanol, formic acid and the like.

The ion complex that is present in the solvent material resulting from the addition of the composition of matter as defined therein is generally stable and capable of functioning as an oxygen donor in the presence of the environment created to generate the same. The material may have any suitable structure and solvation that is generally stable and capable of functioning as an oxygen donor. Particular embodiments of the resulting solution employed in conjunction with the various food stuffs and ingestible material will include a concentration of the ion is depicted by the following formula:

$$\left[H_xO_{\frac{(x-1)}{2}}\right]+$$

wherein x is an odd integer ≥3.

It is contemplated that ionic version of the compound as disclosed herein exists in unique ion complexes that have greater than seven hydrogen atoms in each individual ion complex which are referred to in this disclosure as hydronium ion complexes. As used herein, the term "hydronium ion complex" can be broadly defined as the cluster of molecules that surround the cation $H_xO_{x-1}+$ where x is an integer greater than or equal to 3. The hydronium ion complex may include at least four additional hydrogen molecules and a stoichiometric proportion of oxygen molecules complexed thereto as water molecules. Thus, the formulaic representation of non-limiting examples of the hydronium ion complexes that can be employed in the process herein can be depicted by the formula:

$$\left[H_xO_{\frac{(x-1)}{2}} + (H_2O)_y\right]$$

where x is an odd integer of 3 or greater; and
y is an integer from 1 to 20, with y being an integer between 3 and 9 in certain embodiments.

In various embodiments disclosed herein, it is contemplated that at least a portion of the hydronium ion complexes will exist as solvated structures of hydronium ions having the formula:

$$H_{5+x}O_{2y}+$$

wherein x is an integer between 1 and 4; and
y is an integer between 0 and 2.
In such structures, an $$\left[H_xO_{\frac{(x-1)}{2}}\right]+$$

core is protonated by multiple H₂O molecules. It is contemplated that the hydronium complexes present in the composition of matter as disclosed herein can exist as Eigen complex cations, Zundel complex cations or mixtures of the two. The Eigen solvation structure can have the hydronium ion at the center of an H₉O₄+ structure with the hydronium complex being strongly bonded to three neighboring water molecules. The Zundel solvation complex can be an H₅O₂+ complex in which the proton is shared equally by two water molecules. The solvation complexes typically exist in equilibrium between Eigen solvation structure and Zundel solvation structure. Heretofore, the respective solvation structure complexes generally existed in an equilibrium state that favors the Zundel solvation structure.

The present disclosure is based, at least in part, on the unexpected discovery that stable materials can be produced in which hydronium ion exists in an equilibrium state that favors the Eigen complex. The present disclosure is also predicated on the unexpected discovery that increases in the concentration of the Eigen complex in a process stream can provide a class of novel enhanced oxygen-donor oxonium materials.

The process stream as disclosed herein can have an Eigen solvation state to Zundel solvation state ratio between 1.2 to 1 and 15 to 1 in certain embodiments; with ratios between 1.2 to 1 and 5 to 1 in other embodiments.

The novel enhanced oxygen-donor oxonium material as disclosed herein can be generally described as a thermodynamically stable aqueous acid solution that is buffered with an excess of proton ions. In certain embodiments, the excess of protons ions can be in an amount between 10% and 50% excess hydrogen ions as measured by free hydrogen content.

It is contemplated that oxonium complexes employed in the process discussed herein can include other materials employed by various processes. Non-limiting examples of general processes to produce hydrated hydronium ions are discussed in U.S. Pat. No. 5,830,838, the specification of which is incorporated by reference herein.

The composition disclosed herein has the following chemical structure:

$$\left[H_xO_{\frac{(x-1)}{2}} + (H_2O)_y\right]Z$$

wherein x is and odd integer ≥3;
y is an integer between 1 and 20; and
Z is a polyatomic or monatomic ion.

The polyatomic ion employed can be an ion derived from an acid having the ability to donate one or more protons. The associated acid can be one that would have a pKa values≥1.7 at 23° C. The ion employed can be one having a charge of +2 or greater. Non-limiting examples of such ions include sulfate, carbonate, phosphate, chromate, dichromate, pyrophosphate and mixtures thereof. In certain embodiments, it is contemplated that the polyatomic ion can be derived from mixtures that include polyatomic ion mixtures that include ions derived from acids having pKa values≤1.7.

In certain embodiments, the composition of matter can have the following chemical structure:

$$\left[H_xO_{\frac{(x-1)}{2}} + (H_2O)_y\right]Z$$

wherein x is and odd integer between 3-11;
y is an integer between 1 and 10; and
Z is a polyatomic ion or monatomic ion.

The polyatomic ion can be derived from an ion derived from an acid having the ability to donate on or more protons. The associated acid can be one that would have a $pK_a$ values≥1.7 at 23° C. The ion employed can be one having a charge of +2 or greater. Non-limiting examples of such ions include sulfate, carbonate, phosphate, oxalate, chromate, dichromate, pyrophosphate and mixtures thereof. In certain embodiments, it is contemplated that the polyatomic ion can be derived from mixtures that include polyatomic ion mixtures that include ions derived from acids having $pK_a$ values≤1.7.

In certain embodiments, the composition of matter is composed of a stoichiometrically balanced chemical composition of at least one of the following: hydrogen (1+), triaqua-μ3-oxotri sulfate (1:1); hydrogen (1+), triaqua-μ3-oxotri carbonate (1:1), hydrogen (1+), triaqua-μ3-oxotri phosphate, (1:1); hydrogen (1+), triaqua-μ3-oxotri oxalate (1:1); hydrogen (1+), triaqua-µ3-oxotri chromate (1:1) hydrogen (1+), triaqua-µ3-oxotri dichromate (1:1), hydrogen (1+), triaqua-µ3-oxotri pyrophosphate (1:1), and mixtures thereof in admixture with a polar solvent selected from the group consisting of.

The compound disclosed herein can be admixed with fruit juice that has been extracted or derived from fruit material to produce a fruit juice material to reduce the effective pH of the solution from levels between, for example approximately 5.7 to 6.4 to lower levels between about 4.2 to 4.8. In certain embodiments, it is contemplated that between 0.5 and 5 ml of a 25% solution of containing hydronium ions as disclosed herein can be admixed in 1000 ml of the fruit juice material. It has been found that the resulting material is aesthetically pleasing and presents a flavor that meets or exceeds the flavor presented by conventional fruit juice. It has also been found, quite unexpectedly that the resulting material exhibits greater shelf stability over conventional fruit juice. Without being bound to any theory, it is believed that the presence of the composition as disclosed herein serves to retard spoilage over conventional fruit juice. It has also been discovered, unexpectedly that certain beverages formulated with fruit juices in combination with the composition disclosed herein can be employed with quantities of sweetener that are lower than conventional compositions without composition disclosed herein can be formulated with reduced levels of added sugar without compromising taste and/or shelf stability. Non-limiting examples of suitable fruit juice material that can be employed alone or in any suitable combination with one of more additional fruit juices are as follows citrus fruits such as orange, lemon, grapefruit, tangerine, lemon and lime, various melons such as cantaloupe, honeydew, watermelon, winter melon; berries such as strawberry, blueberry, blackberry, cranberry, as well as fruits such as pomegranate, passionfruit, guava, coconut juice, apple, grape peach, pineapple, kiwifruit, prunes, sugarcane, and the like.

It is also contemplated that the composition as disclosed herein can be admixed with juices derived from various vegetables including but not limited to beets, carrots, celery, cucumbers, dandelion greens, parsley, turnips, watercress, spinach, wheat grass, tomatoes and the like to produce flavorful shelf stable juice material.

It has also been discovered, quite unexpectedly that the composition as disclosed herein can be integrated into brine and pickling solutions to yield a primary foodstuff that exhibits greater resistance to bacterial growth and/or spoilage than foodstuffs. The primary foodstuff so treated also exhibit unexpected increases in base and seasoning flavors over those prepared with conventional methods and formula.

In certain instances, it is contemplated that the compound as disclosed herein can be incorporated onto process water at a concentration between 1 ppm and 500 ppm with concentrations between 10 and 50 ppm being employed in certain applications. The process water can be formulated into a brine solution and can yield an effective pH between 1.0 and 3.0 and poured over cucumbers in a suitable storage container. Where desired or required, the process water can include suitable spices such a garlic or dill. After a suitable process interval, the foodstuff can be subjected to bacterial challenge testing and is found to evidence a 3 log reduction across three microbial tests such as Aerobic Plate Ct., Lactic Acid Bacteria and Psychrotrorhic Bacteria Exposure Testing. In canned food taste testing use of process water incorporating the compound as disclosed herein was very effective at adjusting and optimizing the desired pH without impacting the primary food ingredient's optimal taste.

In order to better understand the invention disclosed herein, the following examples are presented. The examples are to be considered illustrative and are not to be viewed as limiting the scope of the present disclosure or claimed subject matter.

Example I

A novel composition of matter as disclosed herein is prepared by placing 50 ml of concentrated liquid sulfuric acid having a mass fraction $H_2SO_4$ of 98%, an average molarity (M) above 7 and a specific gravity of 66° baume in a non-reactive vessel and maintained at 25° C. with agitation by a magnetic stirrer to impart mechanical energy of 1 HP to the liquid.

Once agitation has commenced, a measured quantity of sodium hydroxide is added to the upper surface of the agitating acid material. The sodium hydroxide material employed is a 20% aqueous solution of 5M calcium hydroxide and is introduced in a five metered volumes introduced at a rate of 2 ml per minute over an interval of five hours with to provide a resonance time of 24 hours. The introduction interval for each metered volume is 30 minutes.

Turbidity is produced with addition of calcium hydroxide to the sulfuric acid indicating formation of calcium sulfate solids. The solids are permitted to precipitate periodically during the process and the precipitate removed from contact with the reacting solution.

Upon completion of the 24-hour resonance time, the resulting material is exposed to a non-bi-polar magnetic field of 2400 gauss resulting in the production of observable precipitate and suspended solids for an interval of 2 hours. The resulting material is centrifuged and force filtered to isolate the precipitate and suspended solids.

Example II

The material produced in Example I is separated into individual samples. Some are stored in closed containers at standard temperature and 50% relative humidity to determine shelf-stability. Other samples are subjected to analytical procedures to determine composition. The test samples are subjected to FFTIR spectra analysis and titrated with hydrogen coulometry. The sample material has a molarity ranging from 200 to 150 M strength and 187 to 178 strength. The material has a gravimetric range greater than 1.15; with ranges greater than 1.9 in certain instances. The composition is stable and has a 1.87 to 1.78 molar material that contains 8 to 9% of the total moles of acid protons that are not charged balanced. FFTIR analysis indicates that the material has the formula hydrogen (1+), triaqua-µ3-oxotri sulfate (1:1).

Example III

A 5 ml portion of the material produced according to the method outlined in Example I is admixed in a 5 ml portion of deionized and distilled water at standard temperature and pressure. The excess hydrogen ion concentration is measured as greater than 15% by volume and the pH of the material is determined to be 1.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law

What is claimed is:

1. A solvent comprising
a compound having the following chemical structure:

$$\left[H_xO_{\frac{(x-1)}{2}}\right]Z_y$$

wherein x is an odd integer ≥3;
y is an integer between 1 and 20; and
Z is one of a monoatomic ion from Groups 14 through 17 having a charge value between −1 and −3 or a polyatomic ion having a charge between −1 and −3; and
a polar liquid selected from the group consisting of short chain alcohols, water and mixtures thereof.

2. The composition of matter of claim 1 wherein x is an integer between 3 and 11 and y is an integer between 1 and 10.

3. The composition of matter of claim 1 wherein the polyatomic ion has a charge of −2 or greater.

4. The composition of matter of claim 3 wherein Z is selected from the group consisting of sulfate, carbonate, phosphate, oxalate, chromate, dichromate, pyrophosphate and mixtures thereof.

5. The composition of matter of claim 1 composed of a stoichiometrically balanced chemical composition of at least one of the following: hydrogen (1+), triaqua-μ3-oxotri sulfate (1:1); hydrogen (1+), triaqua-μ3-oxotri carbonate (1:1), hydrogen (1+), triaqua-μ3-oxotri phosphate, (1:1); hydrogen (1+), triaqua-μ3-oxotri oxalate (1:1); hydrogen (1+), triaqua-μ3-oxotri chromate (1:1) hydrogen (1+), triaqua-μ3-oxotri dichromate (1:1), hydrogen (1+), triaqua-μ3-oxotri pyrophosphate (1:1), and mixtures thereof.

6. A stable electrolyte material comprising
a compound having the following chemical structure:

$$\left[H_xO_{\frac{(x-1)}{2}} + (H_2O)_y\right]Z$$

wherein x is an odd integer ≥3;
y is an integer between 1 and 20; and
Z is one of a monoatomic ion from Groups 14 through 17 having a charge value between −1 and −3 or a polyatomic ion having a charge between −1 and −3; and
a polar liquid selected from the group consisting of short chain polar alcohols, water and mixtures thereof.

7. The composition of matter of claim 6 wherein x is an integer between 3 and 11 and y is an integer between 1 and 10.

8. The composition of matter of claim 6 wherein the polyatomic ion has a charge of −2 or greater.

9. The composition of matter of claim 8 wherein Z is selected from the group consisting of sulfate, carbonate, phosphate, oxalate, chromate, dichromate, pyrophosphate and mixtures thereof.

10. The composition of matter of claim 6 composed of a stoichiometrically balanced chemical composition of at least one of the following: hydrogen (1+), triaqua-μ3-oxotri sulfate (1:1); hydrogen (1+), triaqua-μ3-oxotri carbonate (1:1), hydrogen (1+), triaqua-μ3-oxotri phosphate, (1:1); hydrogen (1+), triaqua-μ3-oxotri oxalate (1:1); hydrogen (1+), triaqua-μ3-oxotri chromate (1:1) hydrogen (1+), triaqua-μ3-oxotri dichromate (1:1), hydrogen (1+), triaqua-μ3-oxotri pyrophosphate (1:1), and mixtures thereof.

11. A chemical formulation comprising:
a chemical composition having the formula:

$$\left[H_xO_{\frac{(x-1)}{2}} + (H_2O)_y\right]Z$$

wherein x is an odd integer ≥3;
y is an integer between 1 and 20; and
Z is a polyatomic ion;
a polar solvent; and
at least one edible food product.

12. The chemical formulation of claim 11 wherein x is an integer between 3 and 11 and y is an integer between 1 and 10.

13. The chemical formulation of claim 12 wherein Z is a polyatomic ion selected having a charge of −2 or greater.

14. The chemical formulation of claim 11 wherein the polar solvent is selected from the group consisting of water, short chain alcohols having between one and four 4 carbon atoms and mixtures thereof.

15. The chemical composition of claim 11 composed of a stoichiometrically balanced chemical composition of at least one of the following: hydrogen (1+), triaqua-μ3-oxotri sulfate (1:1); hydrogen (1+), triaqua-μ3-oxotri carbonate (1:1), hydrogen (1+), triaqua-μ3-oxotri phosphate, (1:1); hydrogen (1+), triaqua-μ3-oxotri oxalate (1:1); hydrogen (1+), triaqua-μ3-oxotri chromate (1:1) hydrogen (1+), triaqua-μ3-oxotri dichromate (1:1), hydrogen (1+), triaqua-μ3-oxotri pyrophosphate (1:1); and mixtures thereof.

16. The chemical formulation of claim 11 wherein the compound is present in an amount between about 0.05% and 50% by volume.

17. The chemical formulation of claim 11 wherein the stable electrolyte is present in an amount sufficient to provide an effective pKa of between 0 and 5.

18. The chemical formulation of claim 11 wherein the stable electrolyte is present in an amount sufficient to provide an effective hydronium ion concentration between about 1 ppm and about 25% by volume.

* * * * *